US 6,627,804 B2

(12) United States Patent
Dickinson

(10) Patent No.: US 6,627,804 B2
(45) Date of Patent: Sep. 30, 2003

(54) ROTATIONALY LIMITED AIR DRIVEN TONE GENERATOR

(76) Inventor: Joseph Willenbecher Dickinson, 12 Congress St., Westfield, MA (US) 01085-2247

( * ) Notice: Subject to any disclaimer, the term of this patent is extended or adjusted under 35 U.S.C. 154(b) by 24 days.

(21) Appl. No.: 10/139,925
(22) Filed: May 6, 2002

(65) Prior Publication Data
US 2002/0194985 A1 Dec. 26, 2002

Related U.S. Application Data
(60) Provisional application No. 60/288,939, filed on May 4, 2001.

(51) Int. Cl.$^7$ .............................................. G10D 13/08
(52) U.S. Cl. ...................................................... 84/402
(58) Field of Search .......................... 84/402, 404, 406, 84/408, 94.1, 94.2, 95.1, 95.2, 96, 97, 98, 103; 446/213–218

(56) References Cited
U.S. PATENT DOCUMENTS

| 214,895 | A | * | 4/1879 | Du Four | 446/213 |
| 346,197 | A | * | 7/1886 | Fagerburg | 40/455 |
| 424,293 | A | * | 3/1890 | Handel | 84/94.2 |
| 2,495,365 | A | * | 1/1950 | Cohn | 84/94.2 |
| 4,872,387 | A | * | 10/1989 | Melia | 84/95.2 |
| 5,315,909 | A | * | 5/1994 | Hsu | 84/404 |
| 5,334,797 | A | * | 8/1994 | Niedge | 84/95.1 |
| 5,473,307 | A | * | 12/1995 | Lam | 340/467 |
| 5,648,624 | A | * | 7/1997 | Smith | 84/404 |
| 6,124,539 | A | * | 9/2000 | Barnes, III | 84/402 |

* cited by examiner

Primary Examiner—Shih-Yung Hsieh

(57) ABSTRACT

A movement limiting suited for use with air gathering means that may also generate tones as a result of motion created by the energy of the wind gathered, is disclosed. The wind gathering means may be either flexible, or substantially rigid. The means are usually planar but may also be three dimensional. The motion is limited to an arc of less than 360 degrees, about a pivot point. The pivot may also be on the longitudinal access of a pole to which wind gathering means, such as flags or banners may be attached. The tone generation means may either generate original tones or cause the regeneration of preselected tones. An advantage of one embodiment of the rotation limitation device is that it prevents flags or banners from wrapping around the flagpole. In another embodiment of the device multiple tones may be generated by the relative motion of the tone actuator and tone generator.

17 Claims, 4 Drawing Sheets

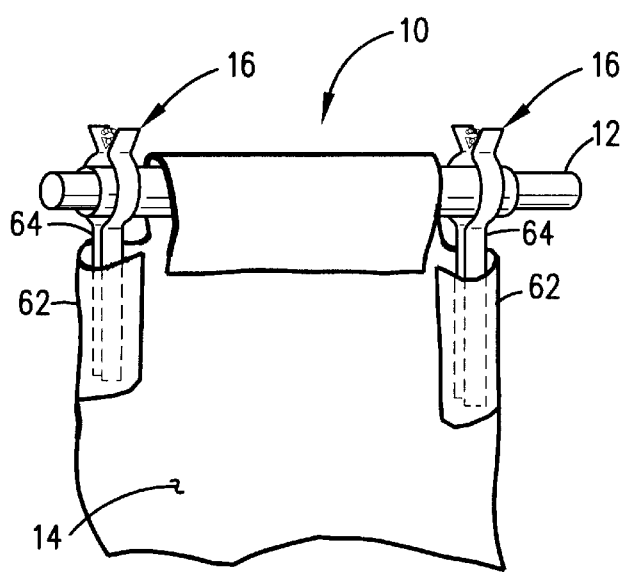
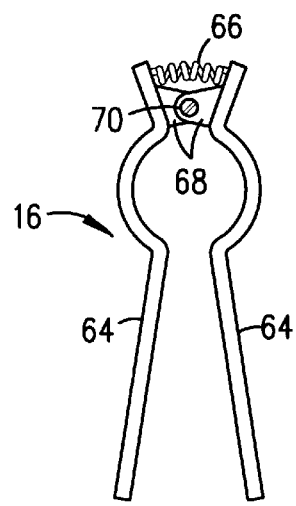
FIG. 3                FIG. 4
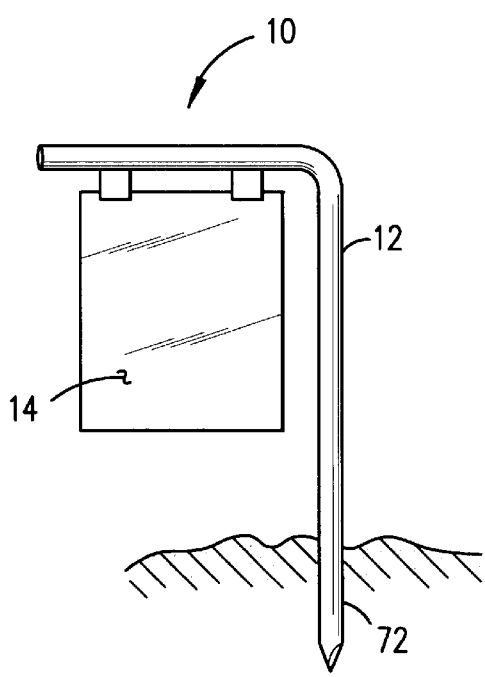
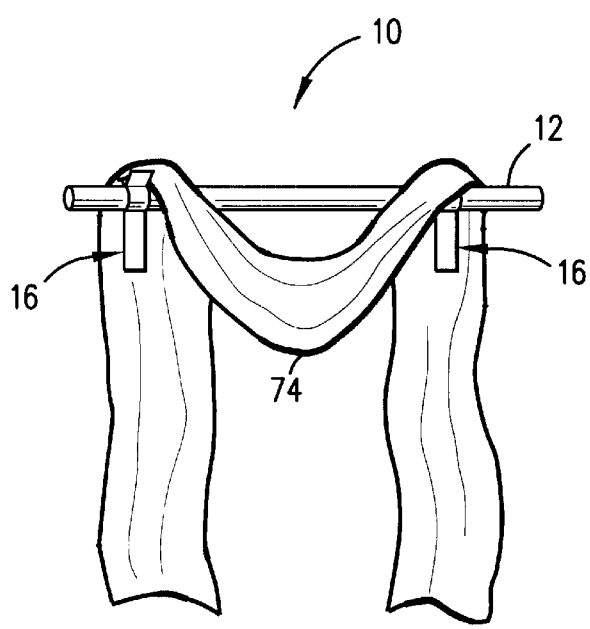
FIG. 5                FIG. 6

ROTATIONALY LIMITED AIR DRIVEN TONE GENERATOR

RELATED APPLICATIONS

This application is based upon my provisional application No. 60/288,939 filed May 4, 2001 and entitled "Leveraged Device for Converting Air Movement Force to Tone Generation".

TECHNICAL FIELD

The present invention relates to devices capturing wind motion and the power derived from the flow of air which have limited motion and more particularly to devices for converting natural wind power or power derived from the flow of air into musical sound while so moving.

BACKGROUND OF THE INVENTION

For many years devices have converted the movement of air into mechanical force. Many of these devices convert wind or air power into musical sound. As windmills pump water, these devices utilize wind-gathering means such as an array of blades or other shapes to capture the kinetic energy of moving air. Generally such an array is attached to a central hub and shaft assembly which is allowed to rotate and thereby translate the movement the air into a rotational mechanical force.

Examples of such devices are disclosed in U.S. Pat. No. 214,895 (1895), U.S. Pat. No. 340,740 (1886), U.S. Pat. No. 346,197 (1886), U.S. Pat. No. 424,293 (1890), U.S. Pat. No. 2,495,365 (1950), U.S. Pat. No. 2,532,835 (1950), U.S. Pat. No. 4,872,387 (1989), U.S. Pat. No. 5,368,515 (1994), U.S. Pat. No. 5,334,797 (1994) and U.S. Pat. No. 5,648,624 (1997). In each of these devices, force generated by the movement of the air is first translated into multiple revolutions of a shaft that in turn connects to a sound producing actuator or actuators.

A rotating helix powered by air movement has also been utilized to produce rotational mechanical forces and thereby power a sound producing actuator as is disclosed in U.S. Pat. No. 1,015,431 (1912). All of these devices convert the flow of air over the device into a more or less steady rotational mechanical motion due to the rotational inertia of the devices. The devices therefore produce a repeating tone or as in the case of U.S. Pat. No. 5,334,797 (1994) a continuous repeating sequence of tones. This repetition may become tiresome to the ear.

Another approach to translating the kinetic energy of moving air into a mechanical force is through the movement of air over and around a surface such as a flag or banner. A number of devices have been designed to allow a flag to rotate freely in the wind about a pole or other support structure. Examples of such devices are found in U.S. Pat. No. 957,606 (1910), U.S. Pat. No. 4,727,822 (1988), and U.S. Pat. No. 5,375,555 (1994). However, no attempt is made in any of these devices to translate the rotation of the flag about the support structure into a useful mechanical force or to create a sound.

Further, limiting rather than allowing for the free rotation of a banner is important in dealing with the common problem of banners over-wrapping on horizontally positioned support structures. Currently, there are a limited number of devices that attempt to restrict rotational motion of rigid elements incorporated into or clamped onto banners. These devices are limited to a cord, rod or weighted tethers attached to the free corners of a flag or banner, or other devices that restrict an insufficient area of the flexible material of the banner to be effective.

The device disclosed in U.S. Pat. No. 3,820,500 (1974), for example, uses a restricting arm that is not fully engaged with or incorporated into the flag. The device is cumbersome in appearance and is not useable with banners that have a hemmed sleeve for fitting onto the pole.

As can be seen from the above a need exists for a bi-directional rotational limiter for use with wind gathering means. Further, such a device would preferably use the force of the wind to generate musical tones. More preferably, such a device would utilize the wind gathering devices as a tone amplifier. To the knowledge of applicant, no such device exists that meets this need in a satisfactory fashion. It is toward meeting this need that the present invention is directed.

BRIEF SUMMARY OF THE INVENTION

The invention is a device for both limiting the motion of a wind gathering means and for converting natural wind power or other airflow into musical sound. In most embodiments of the present invention, the motion being limited by the motion limiting means is the bi-directional rotation of a wind gathering means, which therefore converts natural wind power or other airflow into musical sound. The wind gathering portion of the device most usually comprises a pivoting broad planar surface for intercepting air in motion, though the wind gathering means may be three dimensional. The wind gathering means is mechanically linked to a pick or other sound actuator means. The sound actuator means activates sound generating means. Such a generating means is likely mechanical, but could be connected to an analog or digital reproduction of one or more desired sounds.

In the case of a mechanical sound generation, the mechanical linkage is such that a change in relative position of the planar surface causes a strike corresponding relative change between a tone actuation means such as a pick, and a tone source, or tone generation means with any of its associated tone production means to occur. Three basic arrangements are possible: 1.) The actuating member of the device can be connected to or set in motion by the planar surface, while the tone source is held stationary, 2.) The tone source may be connected to or set in motion by the planar surface while the actuating means is held stationary, and, 3.) The actuating member and the tone source both move and are set in motion by more than one planar surface.

Any combination of the above basic arrangements is possible for creating a strike to occur between the pick and the tone source. Further, the tone source of the device is connected to or mounted on a resonant body to amplify the sound produced. In some configurations of the device the tone source may be capable of producing adequate audible volume for the application without the need for the amplification of the resonant or sound amplifying portion of the device. In other configurations the tone source may have the aid of one of many tone production devices such as an escapement type of action mechanism that aids in the proper striking of the tone-producing element. Such an aid may be engaged and set in motion by the tone activation trigger device of the invention. The idea and development of an escapement action is a defining, well-known feature in piano keyboard design for the control of tone volume.

The planar surface of the device can be formed of a flexible material such as that normally used for a banner or curtain formed of any lightweight flexible material. The planar surface of the device can also be formed of a thin, lightweight, rigid or semi-rigid material such as sheet metal, plastic, or wood. Planar surfaces formed of flexible material are usually more appropriate in configurations of the device wherein the tone source is held stationary with respect to the tone activation trigger which is mechanically linked in some manner to the planar surface.

Configurations of the device in which the planar surface is formed of a rigid or semi-rigid material may appropriately be designed with various relationships between the tone activation trigger and the tone source, i.e., pick movable/ tone source stationary, pick stationary/tone source movable, and pick and tone source free to move relative to one another. In all these configurations of the device the planar surface is understood to supply the power to produce a musical tone through the collective harnessing of the air pressure against its broad surface. These forces are due to natural air movement relative to the surface such as wind or other sources of air movement such as an indoor forced air heating or cooling system or a fan.

Besides providing a sufficiently large surface area to harness energy from the movement of air relative to the surface as the path of air movement changes direction, the planar surface may also be designed to operate as a soundboard. In the configuration of the device wherein the planar surface is formed of a rigid or semi-rigid material, the sound energy generated by the tone source of the device can be mechanically coupled to the planar surface which acts as a soundboard to amplify the sound or musical tone generated by the tone source.

As is well known in the field of acoustics, a soundboard can used to amplify the sound generated by a vibrating tone source through the use of resonant material with a broad surface area. For example, with the harpsichord, the motion of the strings (the tone source) is transmitted to a soundboard on which the strings are mounted, and the vibration of this surface accounts for nearly all of the sound that is heard. Resonant air cavities or boxes are not needed for amplification. If the planar surface is not utilized as a soundboard, the tone source must be of sufficient audible volume by itself.

The device is supported by a rigid (a pipe or a pole) or semi-rigid (e.g. a taut hung rope) structure which is not subject to movement by the force of the moving air. The rigid support need not be straight or even tubular. A garden flag may have an arched support that attaches to the ground. The support may also provide for connection of the support to a surface such as the wall of a building and the surface to which the device is attached may function as a soundboard for the device. The support structure for the device may provide a spiked end to be inserted into the ground (as in a garden flag support), a clip (for attachment to a taut hung rope), a flange (for a mast for a hanging banner), suction cup (for attachment to glass or other smooth surface), or other means appropriate for attaching to a particular surface.

Multiple removable adapters may be provided to allow the support structure of the device to be mounted to a variety of surfaces. Further, the device may provide for anti-theft devices to connect the support to a surface. A pin inserted through the mast of a support for a banner or flag at a point near its connection to a wall or other surface, for instance, could be part of a lock mechanism, which prevents a person from pulling the mast out of the support connection.

The device utilizes a hinged movement to translate the collective forces of the wind to a movement of the tone source or tone activation trigger. The hinged motion has its pivot point on or incorporated into one of the following: 1.) The planar surface, 2.) The support structure, or 3.) A housing connected to the planar surface and/or the support. The pivot may be a rotating sleeve having an axis coincident with the axis of the support structure. The pivot may also be held by a support structure which itself has one or more other pivots, for a truly multidirectional motion of the air collection surface and connected tone activation trigger or tone source hardware.

The sleeve may be an elongated tube with provisions for attachment points for the wind catching surface. The sleeve may provide a surface configuration with raised areas which are designed to engage a mating surface on an attachment clip to provide a positive registration of the clip on the sleeve and to thereby prevent rotation of the clip on the sleeve.

Therefore, the pivot point of the device has as one lever arm the collective forces acting upon a wind (air movement force) catching surface at some distance to the pivot point, and as another lever arm a tone activation trigger or tone source acting with some force upon a corresponding tone source or tone activation trigger (respectively) at some distance to the pivot point.

The tone source of the device can be a tine, a string under tension, or as described in U.S. Pat. No. 5,760,319 (1998), a tone tube, i.e., a string or tine within a tube. Even cutouts on a surface, such as tines (metal fingers) cut out on and from a surface of a metal tube could be used as a tone source.

The device may include multiple tone activation triggers acting on a tone source at any given time. Also, more than one pick may be mounted as lever arms on the pivot point, the multiple lever arms being located at different angles around the circumference of the pivot and thereby causing the tone activation triggers to contact the tone source at varying degrees of rotation about the pivot point. The tone activation triggers may be part of a lever assembly; alternatively they may be separately attached.

One tone activation trigger system, for instance, might include a molded nylon shaft having radial picks, with the shaft being centered within the diameter of a tone tube (as previously referenced). The shaft can be connected to the lever arm through an opening such as a slot in the wall of the tube. Precise positions of the picks may be adjustable with various screw or clamping means on the lever, housing, or support. For instance, a pick composed of a small diameter axial shape may slide within a hole of a pick holding means, with the hole being bisected by a set screw or the pick may be threaded with one end into that hole, while its other end faces the tone source for striking. The picks or other tone activation triggers may be formed of a various commonly known materials.

The planar surface of the device must be connected to the pivot with a lever arm having sufficient length to provide suitable force to the tone activation triggers to generate a musical tone when the tone source is actuated. In the case of a flexible flag, the connection must provide a lever arm of greater length than that needed for use with a rigid wind catching surface of similar dimensions.

A standard 28"x40" flexible nylon or cloth banner, for example, moving in the wind may require a lever arm extending into the flag or banner a few inches in order to generate a force of sufficient magnitude to actuate tone source. The lever arm of the connection is a rigid or semi-rigid structure such as a clip that clamps onto the flag. If the planar surface of the device consists of a sheet of balsa wood, for example, the lever arm of the connection may extend less than an inch onto the surface from the edge. The shorter lever arm is adequate since the planar surface material is stiff enough to maintain its wind-catching shape without the aid of a longer stiff arm to make the connection.

In short, the overall length of the flexible wind catching planar surface almost or fully defines the length of lever arm of the connection. In a device having a rigid planar surface the lever arm of the connection (rigidly attached to the planar surface) can be short because the overall dimension of the planar surface provides a lever arm of sufficient length. Because wind conditions vary, and flags vary in weight, the device may provide for an adjustable connection to the planar surface so that the length of the effective lever arm of the connection may be adjusted to provide sufficient force to actuate the tone source.

The lever arm of the device that connects to flags or banners may provide features for keeping the flags and banners from slipping out of place. For instance, the device may utilize clips that connect to a banner by sandwiching the banner between them. Alternative anti-slip methods of connection include other indented, ridged, or sticking clip surfaces. The clips of this device are configured in such a way as to avoid damage to the banner and are easily applied or removed. The arms of the clips may crimp the banner or flag between them utilizing a special shaped surface, such as ridges on one arm mating with troughs on the opposing arm.

The device may provide for the attachment of flags using their grommets for fastening to the clips. Clips or other provisions for attachment of the wind-catching surface may provide a resonant function through the choice of material, shape or method of attachment to the tone source. Clips may be formed in decorative shapes or colors to enhance the visual impact of the device. Clips may utilize any method of providing sufficient force to grip the wind-catching surface and to hold the clip in place while also facilitating its removal.

Custom designed banners may provide for sewn pockets on the banner to hide the lever arm of a device specifically designed for use with banners. A pocket for connecting to the lever arm of the device can also be created in a flag or banner by folding over a portion of the material and attaching it with hook and loop fasteners.

The force of gravity may be used to return the lever arm and tone activation trigger of the device to a neutral position when air is not acting upon the planar surface. The device may also provide a position resetting force to return the planar surface to a neutral position. A spring can be used to provide the resetting force. A counterweight can also provide the force to return the planar surface to a neutral position. The reset mechanism, the multiple directions of movement of the planar surface (which in turn actuates the tone source), and the intermittent nature of air flow are all serve to randomize the sequence of tone production in a particular device.

A feature common to all possible configurations of the device is that the planar surface that is moved by the airflow is restricted to rotation about a pivot point through an angle of less than 360 degrees; the wind gathering planar surface cannot make a full revolution. In a device where the tone source is located within a tube, the planar surface' rotational freedom is constrained by a screw or pin protruding through a slot in the tube. The restriction on rotation is important in the case of a device where the planar surface is a banner or flag because the surface is prevented from wrapping around the mast. The device could also be utilized as an anti-wrap attachment for a flag or banner with no provision for the creation of a musical tone.

Multiple planar surfaces may be ganged together to power the rotation of a single device. Further, the planar surface need not be a simple shape so long as it serves to capture air motion in more than one direction. If desired the wind catching means need not even be planar, but could comprise any desired three-dimensional shape.

The device may include means for adjusting the speaking length, tension or any other parameter needed to alter the tuning or tone of any or all of the tone producing or amplifying parts of the device. Positioning of sleeves, bridges or holding means associated with this device may be adjustable The device may also incorporate gears into the pivot mechanism to which the lever arm that connects to the planar surface is attached to multiply the force or to increase the number of tones generated by the movement of the air. The incorporation of gears can also provide space-saving or structural advantages based upon this leveraged force.

The device provides a simple and inexpensive means for generating a musical tone from the movement of air. The device allows a simple flag or banner to be used to generate a musical tone when the movement of air relative to the flag or banner causes it to change position. Movement of the air is the sole source of mechanical power to generate the musical tone. Further, the device provides for amplification of the generated musical tone by acoustic means.

Accordingly, a prime object of the present invention is to provide a bi-directional rotationally limited means of using forces generated by airflows to produce sounds.

Another object of the present invention is to provide a bi-directional rotation limiter especially suited for attachment to wind gathering means.

A further object of the present invention is to provide a bi-directional rotationally limited means of using forces generated by airflows to produce sounds where the wind gathering means also amplify the sound generated thereby.

These and further objects, as shall hereafter appear, are readily fulfilled by the present invention in a remarkably unexpected manner as will be readily discerned from the following detailed description of an exemplary embodiment thereof especially when read in conjunction with the accompanying drawings in which like parts bear like numerals throughout.

BRIEF DESCRIPTION OF THE DRAWINGS

In the drawings:

FIG. 3 is an isometric view of the invention wherein the lever arms attaching the banner to the device are clips inserted into pockets;

FIG. 4 a cross-sectional view depicting a clip for attaching a flag or banner to the device;

FIG. 5 is an elevation view depicting the invention wherein the planar surface is in a vertical neutral position and the support structure of the invention is a curved tube inserted into the ground;

FIG. 6 is an elevation view depicting the invention wherein the support structure is a mast and the planar surface is a curtain attached with clips;

DESCRIPTION OF THE PREFERRED EMBODIMENT

A brief description of an exemplary embodiment of the present invention is set forth herein in sufficient detail to allow a person skilled in the art to understand the operation and fully utilize the invention. The numbered parts of the description refer to the parts identified in the attached figures in which like parts bear like numerals throughout the invention.

Figures 1A, 1B:
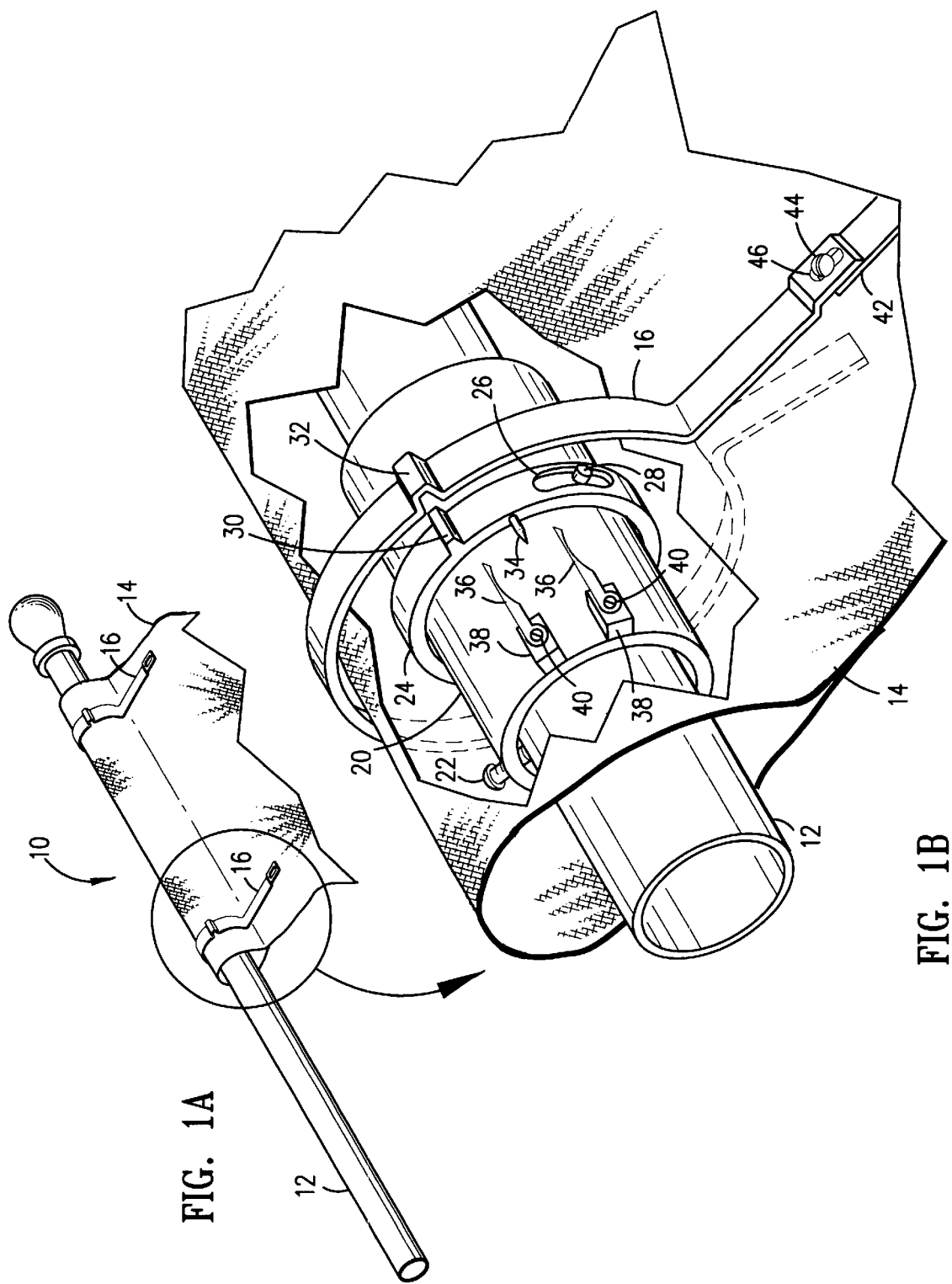
FIG. 1A is an isometric view of the invention wherein the wind gathering means is a banner or flag.
FIG. 1B is an exploded isometric view of the invention depicted in FIG. 1A

As shown in FIG. 1A, the present invention, identified by the general reference 10, is comprised of a support structure 12 and wind gathering means 14 for the collection of the force generated by the movement of air. Clips 16 secure means 14 to the invention 10. FIG. 1B shows a detail of the tone generation portion of the invention. The mechanism of the invention is contained within a pocket formed in the attachment end of means 14.

Stationary collar 20 is concentrically placed on support structure 12 and adjustably secured in place by screw 22 which is threaded into stationary collar 20 and contacts support structure 12. Rotating collar 24 is concentrically placed on stationary collar 20. Rotating collar 24 is free to rotate about the axis of the support structure 12 through an angle determined by the length of slot 26 along the circumference of rotating collar 24 and the diameter of pin 28.

Pin 28 is rigidly attached to stationary collar 20. A raised portion 30 in the surface of rotating collar 24 is provided for engaging the clip 16. A channel 32 is provided in clip 16 having dimensions appropriate to engage the raised portion 30 of rotating collar 24. Pick 34 is rigidly attached to rotating collar 24 and extends outwardly from the edge of rotating collar 24 parallel to the axis of rotation of rotating collar 24.

Multiple tines 36 that provide the tone source are rigidly mounted to stationary collar 20 utilizing mounting blocks 38 and screws 40. The length of the one or both of the lever arms of clip 16 can be made adjustable as shown in FIG. 1B by attaching a lever arm extension 42 utilizing screw 44 which operates in slot 46 provided in the lever arm of clip 16.

Figures 2A, 2B:
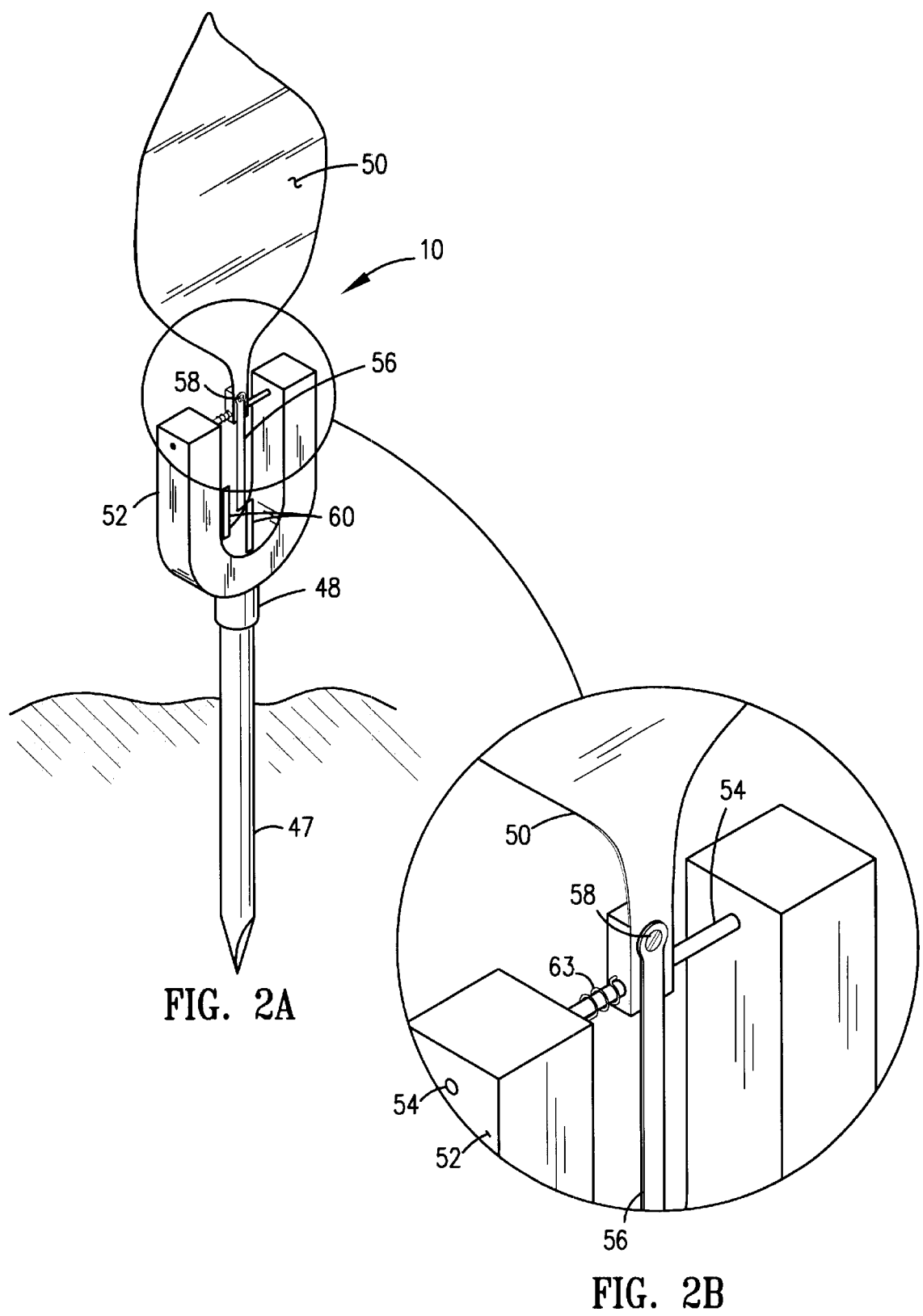
FIG. 2A is an isometric view of the invention wherein the wind gathering means is a rigid material having an aesthetic shape.
FIG. 2B is an exploded isometric view of the invention depicted in FIG. 2A

FIG. 2A depicts an embodiment of the present invention in which the tone source of the invention is moveable and the pick is fixed with respect to the support. Referring to FIG. 2A, the invention 10 is mounted to the earth by support structure 47. Swivel 48 allows the planar surface 50, which captures the force of air movement to rotate freely about the axis of the support structure 46. Attached to swivel 48 is a "u-shaped" structure 52, which supports the planar surface 50 through pivot pin 54. Tine 56 (the tone source) is rigidly attached to planar surface 50 using attachment screw 58. Picks 60 are rigidly attached to "u-shaped" structure 52. A spring 63, concentrically located around pivot pin 54 provides rotational force to restore planar surface 50 to a vertical position (as shown in FIG. 2(A)) when there is no movement of air.

Referring to FIG. 3, an embodiment of the present invention is shown wherein additional pockets 62 have been provided in flag or banner 14 into which the lever arms 64 of clips 16 have been inserted. Referring to FIG. 4, an embodiment of the present invention is shown in which clip 16 provides a clamping force to hold the wind gathering means 14, in this case a flag or banner in place with respect to the invention through the use of a spring 66 acting against tabs 68 and wherein lever arms 64 rotate about hinge 70.

In FIG. 5, an embodiment of the present invention 10 is depicted in which support structure 12 is tube having an approximate 90° bend at an appropriate height and a sharpened base end 72 which can be placed into the earth. This embodiment of the present invention allows the invention to be utilized in a portable mode wherein the point of the support structure is driven into the earth a desired location and the neutral position of the planar surface 14 is a near vertical plane.

Referring to FIG. 6, an embodiment of the present invention is shown in which the planar surface of the invention is a flexible material 74 draped over the invention and retained by clips 16.

Figure 7:
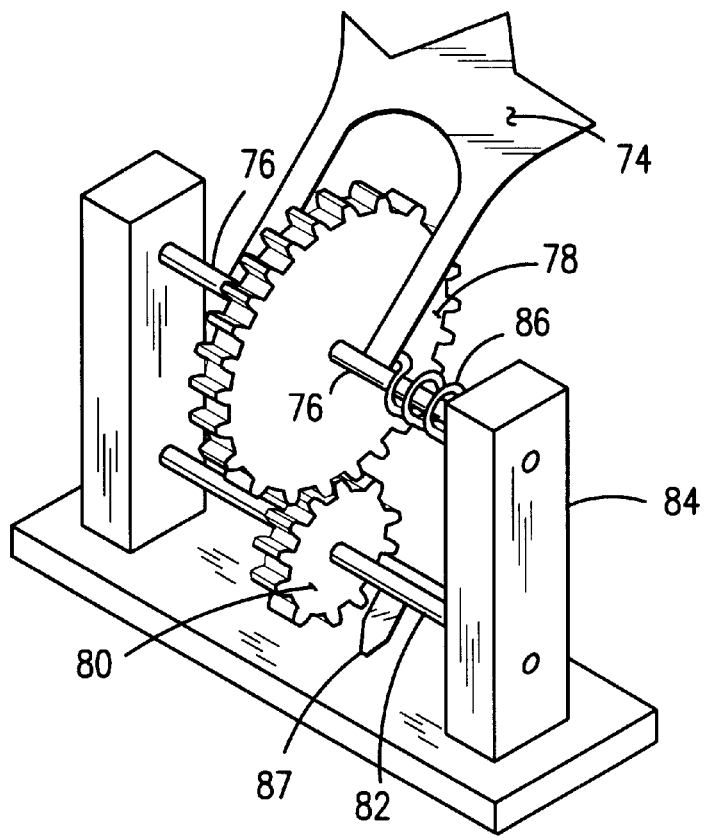
FIG. 7 is an isometric exploded view of the invention depicting a method of gearing between the wind-catching surface and the pick.

Shown in FIG. 7, is an embodiment of the present invention in which gearing is utilized to create a greater number of tones for a given movement of the air collecting surface of the invention. Planar surface 74 is rigidly attached to shaft 76, which is free to rotate in support 84. Gear 78 is likewise rigidly attached to shaft 76. Gear 80 is of a smaller diameter than gear 78 and is rigidly attached to shaft 82. Shaft 82 is free to rotate in support 84 and is parallel to shaft 76 and located in such proximity to shaft 76 that the teeth of gears 78 and 80 engage. Pick 87, which strikes the tone generation portion of the invention (not shown) is rigidly attached to shaft 82. Spring 86 located concentrically to shaft 76 and supplies the rotational force to restore planar surface 74 to a vertical orientation when force from the movement of air is not present.

Figure 8:
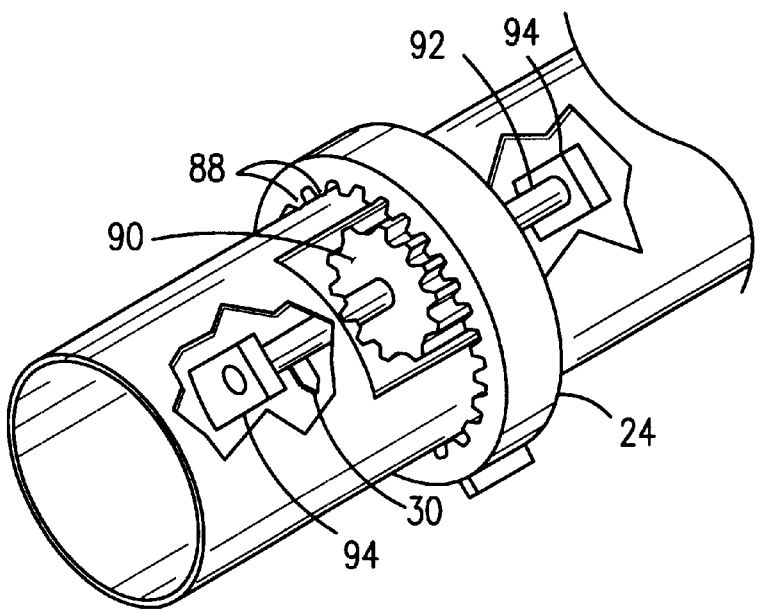
FIG. 8 is an isometric exploded view of the invention depicting a method of gearing between the clips and the pick.

Shown in FIG. 8 the present invention shown in FIG. 1(B) with gearing added between the rotating collar 24 and pick 30. The rotating collar 24 includes teeth 88 added to the inside diameter. A gear 90 mounted rigidly to shaft 92 and mounted to support structure utilizing mounting blocks 94. Shaft 92 is free to rotate in mounting blocks 94. Pick 30 is rigidly attached to shaft 92 and strikes the tone source of the invention (not shown) as it rotates.

From the foregoing, it is readily apparent that all of the aforestated objects have been realized by the invention described above. Such modifications, alterations and variations as may be apparent to an artisan having ordinary in the art to which this invention pertains are included within the spirit of the present invention which is limited solely by the scope of the claims appended hereto.

What is claimed is:

1. An motion limiting tone generating mechanism comprising:
    air gathering means;
    motion limiting means operatively connected to said air gathering means that limit the motion of said air gathering means to an arc of less than 360 degrees about a pivot point;
    mechanical movement means operatively connected to said air gathering means;
    tone actuation means operatively connected to said mechanical movement means; and
    tone generation means operatively connected to said mechanical movement means in such a manner so that motion of said actuation means relative to said generation means cause the intermittent actuation of said generation means.

2. A mechanism according to claim 1 wherein said pivot is located on the longitudinal axis of a pole.

3. A mechanism according to claim 2 wherein said air gathering means are substantially shape conforming to said air.

4. A mechanism according to claim 1 wherein said air gathering means are substantially rigid.

5. A mechanism according to claim 4 wherein said pivot is contained on a support structure comprising a pivoting base.

6. A mechanism according to claim 5 wherein said base also comprises restorative force means to return said substantially rigid air gathering means to a neutral position in the substantial absence of air movement.

7. A mechanism according to claim 1 wherein said tone generation means comprises pre-recorded sounds.

8. A mechanism according to claim 1 wherein said tone generation means interacts with said tone actuation means to produce original sounds.

9. A mechanism according to claim 8 wherein said air gathering means also amplify said original sounds.

10. A motion limiting device especially suited for use in conjunction with air gathering means operatively connected to a pole comprising;

a collar operatively connected to said pole;

a motion limiting pin operatively interconnecting said pole and said collar;

and a clip arm operatively interconnecting with said pole and said collar coacting to restrict the rotational movement of said pole to an arc of less than 360 degrees.

11. A device according to claim 10 wherein said clip arm has protrusions especially adapted to firmly secure said air gathering means to said collar.

12. A device according to claim 11 especially adapted to receive flexible wind gathering means.

13. A device according to claim 10 wherein said specially adapted wind gathering means are rigid.

14. A tone generating motion limiting device especially suited for use in conjunction with air gathering means operatively connected to a pole comprising;

a collar operatively connected to said pole;

a motion limiting pin operatively interconnecting said pole and said collar;

a clip arm operatively interconnecting with said pole and said collar coacting to restrict the rotational movement of said pole to an arc of less than 360 degrees;

tone actuation means operatively connected to said mechanical movement means; and tone generation means operatively connected to said mechanical movement means in such a manner so that motion of said actuation means relative to said generation means cause the intermittent actuation of said generation means.

15. A device according to claim 14 also including air gathering means that cause said pole to rotate in response to air movement.

16. A device according to claim 14 also including rigid air gathering means comprised of resonant material.

17. A device according to claim 15 wherein said rigid air gathering means are comprised of resonant material.

* * * * *